(12) United States Patent
Fok et al.

(10) Patent No.: US 9,769,669 B2
(45) Date of Patent: Sep. 19, 2017

(54) APPARATUS AND METHODS FOR SECURE ARCHITECTURES IN WIRELESS NETWORKS

(71) Applicant: QUALCOMM Incorporated, San Diego, CA (US)

(72) Inventors: Kenny Fok, San Diego, CA (US); Eric Chi Chung Yip, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 13/661,816

(22) Filed: Oct. 26, 2012

(65) Prior Publication Data

US 2013/0054973 A1 Feb. 28, 2013

Related U.S. Application Data

(63) Continuation of application No. 11/438,512, filed on May 19, 2006, now Pat. No. 8,320,880.

(60) Provisional application No. 60/701,252, filed on Jul. 20, 2005.

(51) Int. Cl.
*H04M 1/66* (2006.01)
*H04M 1/68* (2006.01)
*H04M 3/16* (2006.01)
*H04W 12/12* (2009.01)
*G06F 21/44* (2013.01)
*H04W 12/04* (2009.01)
(Continued)

(52) U.S. Cl.
CPC .......... *H04W 12/12* (2013.01); *G06F 21/445* (2013.01); *H04W 12/04* (2013.01); *H04W 12/06* (2013.01); *H04W 88/02* (2013.01)

(58) Field of Classification Search
CPC ..... H04W 12/04; H04W 12/06; H04W 24/08; H04W 48/18; H04W 12/12; H04L 63/062; H04L 63/0869; H04L 63/0892; H04L 2463/061
USPC ........ 455/410, 411, 423, 418, 419; 380/247, 380/248, 249, 270, 282; 726/4, 10; 713/150, 152, 168, 171, 172, 181, 182
See application file for complete search history.

(56) References Cited

U.S. PATENT DOCUMENTS 6,449,473 B1 * 9/2002 Raivisto ................ H04L 9/3242
380/283
6,480,725 B2   11/2002 Cassidy et al.
6,944,478 B1    9/2005 Durand
(Continued)

FOREIGN PATENT DOCUMENTS

EP    1158745 A1 * 11/2001 ............. H04L 29/06
GB    2332604         3/2003
(Continued)

OTHER PUBLICATIONS

European Search Report—EP11006930—Search Authority—Munich—Oct. 26, 2011.
(Continued)

*Primary Examiner* — Olumide T Ajibade Akonai
(74) *Attorney, Agent, or Firm* — Won Tae C. Kim

(57) ABSTRACT

Apparatus, methods, computer readable media and processors may provide a secure architecture within which a client application on a wireless device may, in some aspects, exchange information securely with resident device resources, and in other aspects, with a remote server over a wireless network.

19 Claims, 13 Drawing Sheets

(51) Int. Cl.
*H04W 88/02* (2009.01)
*H04W 12/06* (2009.01)

(56) References Cited

U.S. PATENT DOCUMENTS

| | | |
|---|---|---|
| 7,114,080 B2 | 9/2006 | Rahman et al. |
| 7,117,364 B1 | 10/2006 | Hepper et al. |
| 7,129,853 B2 | 10/2006 | Kaplan |
| 7,197,643 B2 * | 3/2007 | Takase .................. 713/171 |
| 7,313,705 B2 | 12/2007 | Turkboylari |
| 7,392,376 B2 | 6/2008 | McKenney et al. |
| 7,394,901 B2 * | 7/2008 | Fischer et al. ............. 380/270 |
| 7,624,439 B2 | 11/2009 | Koestler |
| 7,743,407 B2 | 6/2010 | Sprigg et al. |
| 7,814,502 B2 | 10/2010 | Blomqvist et al. |
| 7,904,079 B1 * | 3/2011 | Lundy et al. ............... 455/423 |
| 8,320,880 B2 | 11/2012 | Fok et al. |
| 2001/0049263 A1 * | 12/2001 | Zhang ....................... 455/67.1 |
| 2003/0114144 A1 | 6/2003 | Minemura |
| 2003/0196084 A1 * | 10/2003 | Okereke et al. ............ 713/156 |
| 2004/0025022 A1 * | 2/2004 | Yach ..................... G06F 21/121 713/176 |
| 2004/0058651 A1 * | 3/2004 | Ross ..................... H04W 24/00 455/67.11 |
| 2004/0127196 A1 | 7/2004 | Dabbish et al. |
| 2004/0203598 A1 | 10/2004 | Aerrabotu et al. |
| 2005/0021477 A1 | 1/2005 | Krishnan et al. |
| 2005/0105731 A1 | 5/2005 | Basquin |
| 2005/0202803 A1 | 9/2005 | Mahalal |
| 2005/0252963 A1 | 11/2005 | Adams et al. |
| 2006/0010499 A1 | 1/2006 | Falcon et al. |
| 2006/0141985 A1 | 6/2006 | Patel et al. |

FOREIGN PATENT DOCUMENTS

| | | |
|---|---|---|
| JP | 2002517853 A | 6/2002 |
| JP | 2004199300 A | 7/2004 |
| JP | 2005508059 A | 3/2005 |
| JP | 2005129063 A | 5/2005 |
| JP | 2005129066 A | 5/2005 |
| JP | 2005157792 A | 6/2005 |
| JP | 2005157968 A | 6/2005 |
| TW | 484292 | 4/2002 |
| TW | 494334 | 7/2002 |
| TW | 495680 | 7/2002 |
| TW | 554273 | 9/2003 |
| TW | 560159 | 11/2003 |
| WO | 9858306 | 12/1998 |
| WO | 9945454 A1 | 9/1999 |
| WO | 9964947 A1 | 12/1999 |
| WO | 2009039064 | 3/2009 |

OTHER PUBLICATIONS

International Search Report—PCT/US06/027676, International Search Authority—European Patent Office—May 19, 2009.
Written Opinion—PCT/US06/027676, International Search Authority—European Patent Office—May 19, 2009.

* cited by examiner

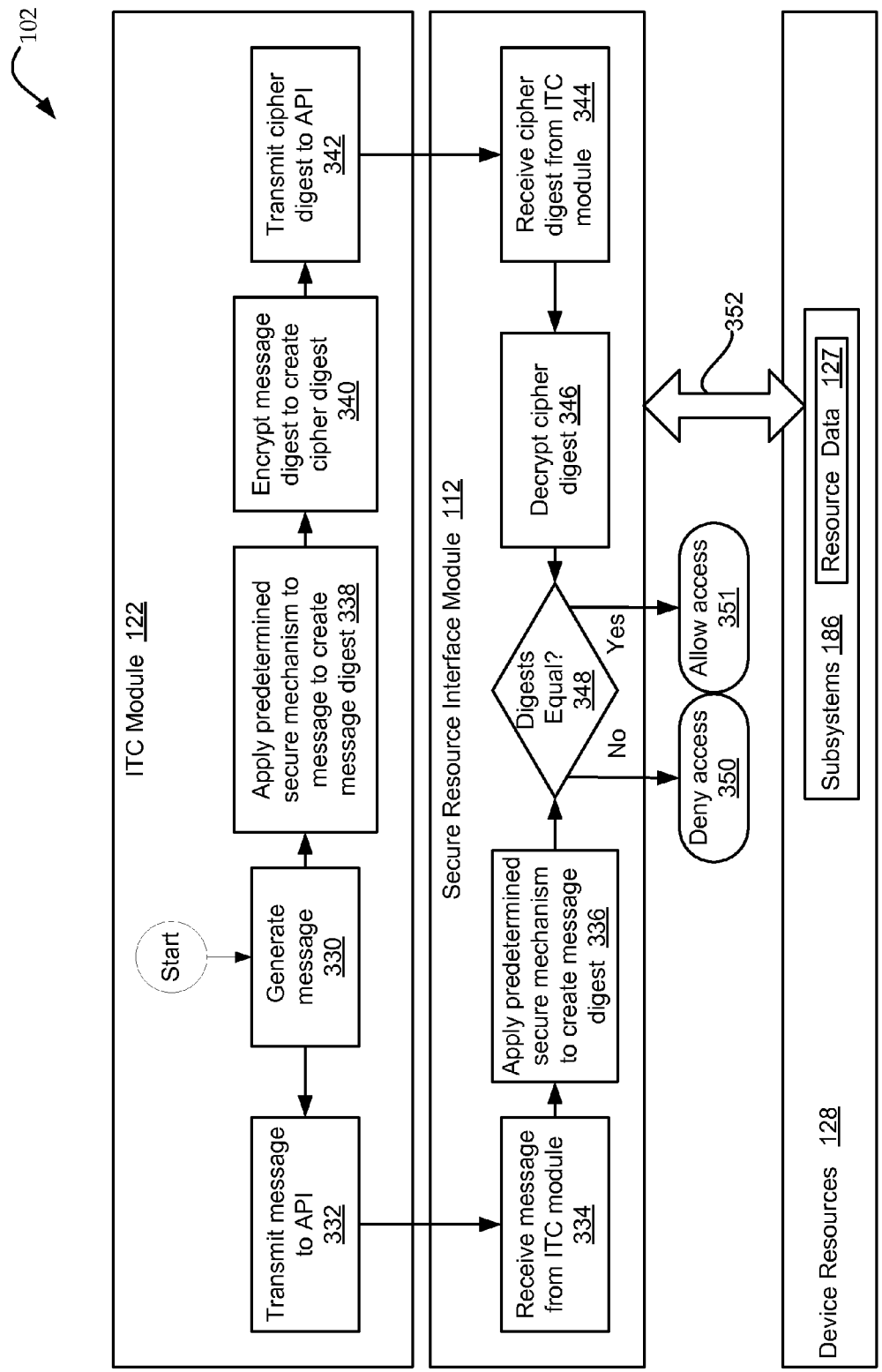

APPARATUS AND METHODS FOR SECURE ARCHITECTURES IN WIRELESS NETWORKS

CLAIM OF PRIORITY

The present Application for Patent is a continuation of patent application Ser. No. 11/438,512, entitled "Apparatus and Methods for Secure Architectures in Wireless Networks," filed May 19, 2006, which claims priority to Provisional Application No. 60/701,252, entitled "Methods and Apparatus for Secure Architectures in Wireless Networks," filed Jul. 20, 2005, both of which applications are expressly incorporated by reference herein in their entireties.

FIELD OF INVENTION

The described embodiments generally relate to wireless communication devices and computer networks, and more particularly relate to apparatus and methods for secure architectures in wireless networks.

BACKGROUND

Wireless networking connects one or more wireless devices to other computer devices without a direct electrical connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, including firmware incorporated on original equipment manufacturer (OEM) chipsets, which individually and cooperatively operate and generate data in accordance to their design and specific protocol or configuration. Such designs and configurations may include, for example, accessing firmware resident diagnostic tools operable to transmit and receive data in open communication connections with networked devices.

Data being transmitted between wireless devices and remote servers often includes sensitive material and may be subject to malicious attack. For example, client configurations may be downloaded from a remote server to a wireless device. As these configurations may provide insight into a vendor's network operations, a vendor may wish to secure such transmissions from prying eyes. Furthermore, network diagnostic applications resident on a wireless device may transmit network statistics or other log information to a remote server. These logs may contain information useful to a competitor and as a result, may be targeted for interception. Furthermore, intercepting the messages between the wireless client and the server may allow a competitor to reverse engineer the client server interface in order to spoof the legitimate server and communicate with the wireless client with malicious intent.

Furthermore, within the wireless device itself, unauthorized client applications downloaded to the device may maliciously or unintentionally access an application programming interface ("API") with handset firmware, with the potential for causing damage to the handset and to the network.

Accordingly, it would be advantageous to provide apparatus and methods providing a secure architecture for wireless devices.

SUMMARY

The described embodiments comprise apparatus, methods, computer readable media and processors operable on a wireless device and a remote device to provide a secure architecture in wireless networks within which a client application resident on the wireless device may exchange information securely with the remote server over a wireless network.

Cryptographic mechanisms may provide authentication of the identity of the remote server prior to downloading an encrypted command and a client configuration to the wireless device. A client data log may also be encrypted on the wireless device prior to uploading to the remote server. Furthermore, the secure architecture may provide an authentication mechanism operable to protect both the wireless device and the wireless network from abuse by an unauthenticated remote server and/or client application.

In some aspects, a method for securely exchanging information comprises authenticating an identity of a client application resident on a wireless device based upon a request by the client application to access a device resource on the wireless device. The request is based on a remotely received information retrieval configuration. Further, the method includes providing the client application with access to a predetermined portion of the device resource based upon a result of the authentication.

In a related aspect, a machine-readable medium comprises instructions which, when executed by a machine, cause the machine to perform operations comprising the actions noted above. Another related aspect comprises at least one processor is configured to perform the above-described actions.

In other aspects, a wireless device comprises means for authenticating an identity of a client application resident on a wireless device based upon a request by the client application to access a device resource on the wireless device. The request is based on a remotely received information retrieval configuration. Further, in this aspect, the wireless device further comprises means for providing the client application with access to a predetermined portion of the device resource based upon a result of the authentication.

In still other aspects, a wireless communication device comprises a device resource comprising at least one of device-related data and network-related data. The wireless communication device in this aspect further comprises a resource interface module operable to receive an access request for access to the device resource, wherein the access request is based on a remotely received information retrieval configuration. Further, the access request comprises a client application module identification and a security mechanism. Additionally, the resource interface module is operable to authenticate the client application module identification and a corresponding predetermined access level to the device resource based on the security mechanism.

In another aspect, a method for secure information exchange with a wireless device over a wireless network comprises establishing a communication protocol with the wireless device, and generating a collection configuration operable to cause the wireless device to collect predetermined information from a device resource on the wireless device. In this aspect, the method further includes transmitting the collection configuration and security mechanism to the wireless device over the wireless network, and receiving from the wireless device the predetermined information based on the collection configuration if the security mechanism authenticates the apparatus to the wireless device based on a predetermined security procedure.

In a related aspect, a machine-readable medium comprises instructions which, when executed by a machine, cause the machine to perform operations comprising the actions noted above. Another related aspect comprises at least one processor is configured to perform the above-described actions.

In still other aspects, a remote server comprises means for establishing a communication protocol with the wireless device, and means for generating a collection configuration operable to cause the wireless device to collect predetermined information from a device resource on the wireless device. In these aspects, the remote server further comprises means for transmitting the collection configuration and security mechanism to the wireless device over the wireless network, and means for receiving from the wireless device the predetermined information based on the collection configuration if the security mechanism authenticates the apparatus to the wireless device based on a predetermined security procedure.

In yet other aspects, an apparatus for exchanging data with a wireless device comprises a configuration generator operable to generate a configuration for receipt by a wireless device, the configuration operable to cause the wireless device to collect predetermined information from a device resource on the wireless device. The apparatus further comprises an information repository operable to store information collected from the wireless device based on the configuration, and a communications module and a processor operable to establish a connection between the apparatus and the wireless device over a wireless network. Additionally, the apparatus comprises a security module operable to provide a predetermined security mechanism to the wireless device, the predetermined security mechanism based on a predetermined exchange protocol with the wireless device, wherein the predetermined security mechanism authenticates the apparatus to the wireless device.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which:

FIG. 13 is a flowchart diagram of an aspect of a method for unlocking wireless device resources for use by a memory resident client application according to the system of FIG. 1.

DETAILED DESCRIPTION

Figure 1:
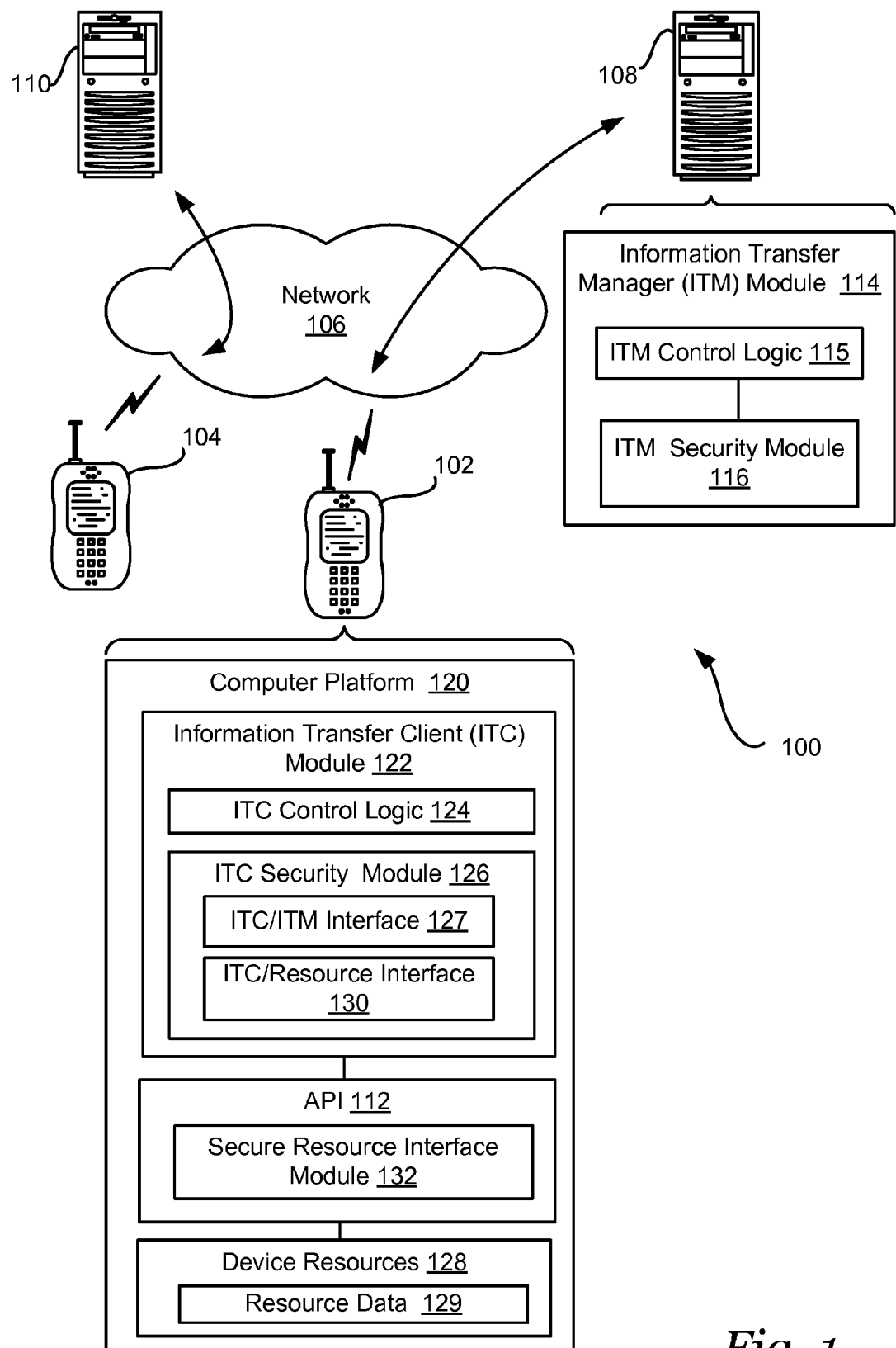
FIG. 1 is a schematic diagram of one aspect of a system for providing a secure architecture in wireless networks.

Referring to FIG. 1, a secure communications system 100 may comprise, in some aspects, mechanisms and procedures for securely exchanging data/information between predetermined wireless devices and corresponding predetermined remote network devices located across a wireless network. For example, in some aspects, a first server may be associated with a first group of wireless devices, and a second server may be associated with a second group of wireless devices. The described aspects provide security mechanisms, for example, that prevent unauthorized communications between the first server and the second group of devices, and between the second server and the first group of devices, thereby providing a secure client/server interface. In further aspects, system 100 may comprise mechanisms and procedures for securely exchanging data/information within a wireless device, such as between a client application and a wireless device resource. For example, in some aspects, the system provides for security mechanisms that prevent unauthorized communications between an application or code resident on the wireless device and predetermined wireless device resources, thereby providing a secure client/device resource interface.

For example, in one aspect, an information transfer client ("ITC") module 122 resident on a wireless device 102 enables secure communication with an information transfer manager ("ITM") module 114 resident on a remote server 108 over a wireless network 106. As such, system 100 may permit multiple secure and independent network connections over a common wireless network. One network may comprise, for example, remote server 108 and at least one wireless device 102 associated with one entity, such as a first network carrier. Similarly, a second network may comprise remote server 110 and at least one wireless device 104 associated with another entity, such as a second network carrier.

Furthermore, in an example of another aspect, a secure resource interface module 132 resident on wireless device 102 may be operable to restrict access by client applications, such as ITC module 122, to application programming interface ("API") 112, which provides access to device resources 128. ITC module 122 may include ITC control logic 124 for controlling all operations of ITC module 122 and may communicate with ITC security module 126. ITC security module 126 provides a secure interface with remote networking devices, such as remote server 108 and ITM module 114, and well as with local device resources, such device resources 128 via secure resource interface module 132.

Each of ITC module 122, ITM module 114 and secure resource interface module 132 may include one or more secure mechanisms to provide authentication, communications setup and secure transfer data. For example, such secure mechanisms may include secure hash functions, symmetric key encryption, public key encryption, and any other cryptography mechanism and/or method to ensure the authentication of parties and the secure exchange of information. Thus, in some aspects, system 100 provides a wireless device with a secure external communications interface and/or, in other aspects, with a secure internal communication interface.

Figure 2:
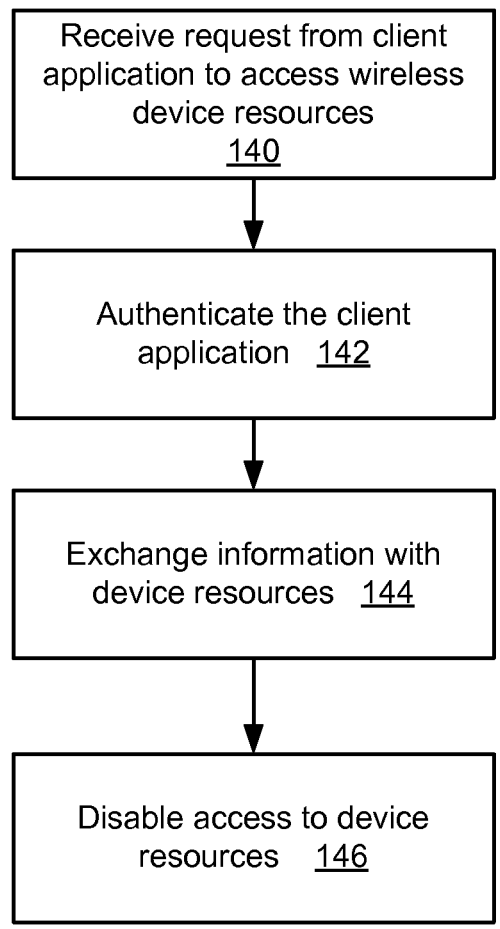
FIG. 2 is a flowchart for authenticating a client application on a wireless device according to FIG. 1.

Referring to FIG. 2, one aspect of a method for securely exchanging information within a wireless device may include, at step 140, a receiving a request to access wireless device resources 128. For example, a client application, such as ITC module 122, resident on wireless device 102 may interact with device resources 128 to provide functionality to the device. As such, ITC module 122 may generate a request to access device resources 128, and such a request may be received by secure resource interface module 132. Non-limiting, the request received at step 140 may be initiated at power up of the wireless device 102, prior to a first request for device data 129, and upon user request. Request 140 may be initiated to unlock API 112 for future requests although no resource data 129 need be transmitted at this time.

This aspect of the method may further include, at step 142 authenticating the client application making the access request. For example, authentication software may be coded into each API 112, or API 112 may call upon secure resource interface module 132 to perform the authentication. Authentication at step 142 may comprise one or more cryptographic mechanisms, and may include the generation of a digital signature by an ITC/resource interface 130 component of the client application. This data may then be forwarded to secure resource interface module 132.

Furthermore, each device resource may have different levels of access, and authentication may involve a client application requesting and/or being assigned the proper access level. In some embodiments, the assigned access level may be determined based upon a particular security mechanism, such as a key, provided by the client application at the time of authentication.

The method may further include, at step 144, exchanging information with a device resource. For example, once authenticated, a client application may make any number of requests of the device resource 128 based on the granted, predetermined level of access, thereby allowing faster access to resource data 129. It should be noted, however, that in other aspects, the number of requests may be limited, and/or each request may require a new authentication.

Additionally, the method may include, at step 146, disabling access to the device resources. For example, the secure resource interface module 132 may, at step 146, remove access to device resource 128 based on a lack of activity by the client application. Access may be reestablished upon re-authentication of the client application. In other embodiments, the interface between a client application and a device resource may be disabled at power down of the wireless device 102. Furthermore, the interface between a client application and a device resource may be disabled by an attempt made by the client application to access device data outside of the authenticated access level.

Figure 3:
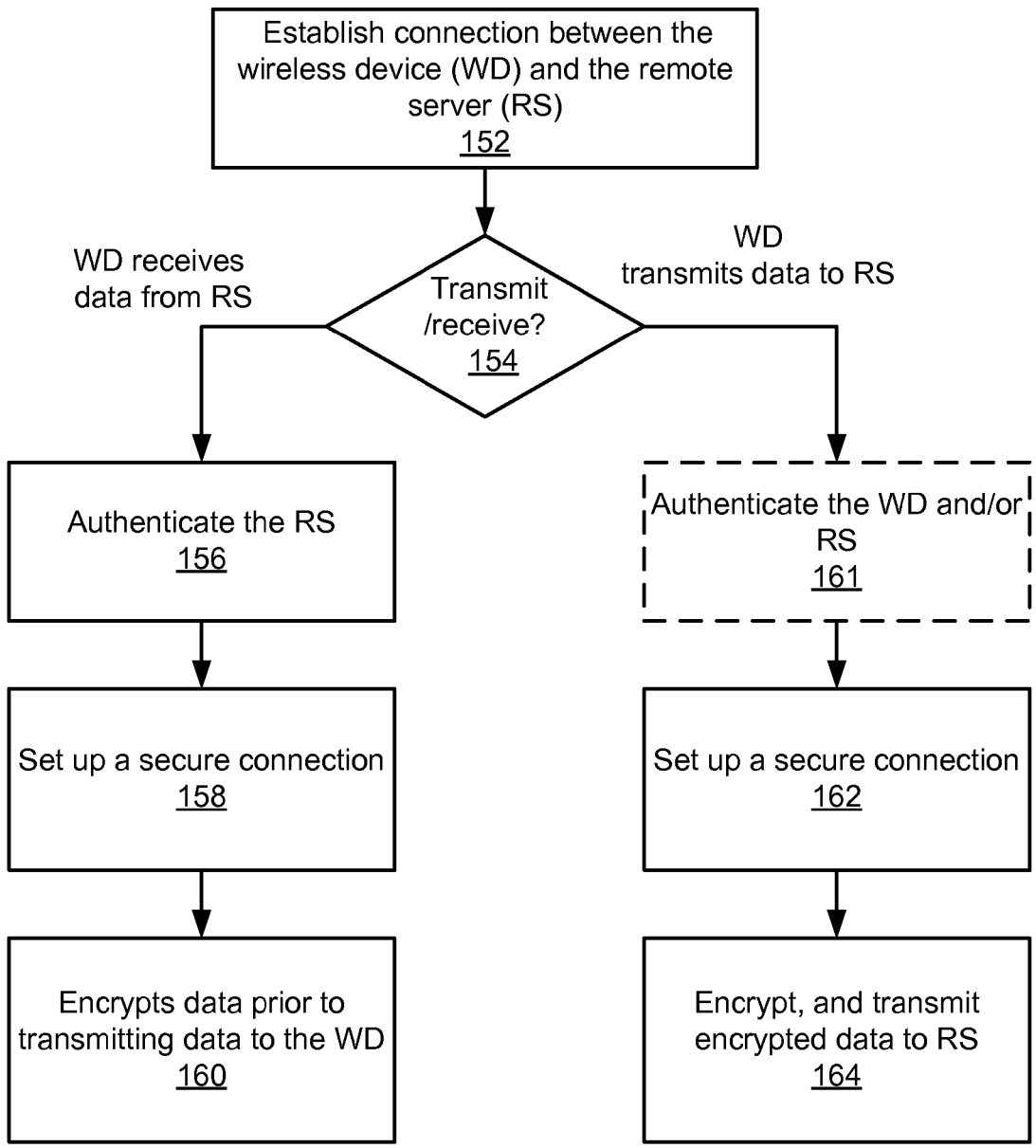
FIG. 3 is a flowchart for implementing a secure architecture according to the system of FIG. 1.

FIG. 3 discloses an aspect of a method by which an application residing on a wireless device and a remote server may, once authenticated, employ the methods and apparatus of system 100 to securely exchange data. In one aspect, the method may be utilized by an application such as IT client module 122, which desires to authenticate an IT manager module 114 attempting to send commands and/or retrieve information from the IT client module. For example, such authentication may be desired to ward off rogue IT manager modules that are not properly associated with the given wireless device 102 and/or IT client module 122. In another aspect, the method may be utilized by a remote server such as remote server 108 to insure that it is receiving information from a properly associated wireless device. Referring primarily to FIG. 3, and secondarily to FIG. 1, at step 152, the method may include establishing a communications connection between a wireless device and a remote server. For example, an HTTP connection may be established over wireless network 106 between wireless device 102 and remote server 108. In one aspect, the remote server 108 may transmit data to the wireless device 102, for example to load a new client configuration or to execute a command on the wireless device 102. In another aspect, a client application on a wireless device 102 may upload a client log of information collected from the device comprising, for example, wireless device diagnostic data, a spam log, a virus log, network data, etc.

At step 154, the method may include determining if information is to be transmitted or received. For example, if the remote server 108 is to transmit data to the wireless device 102, at step 156, the IT client module 122 may invoke IT client security module 126 to initiate an authentication process to verify the identity and affiliation of the remote server 108. Methods of authenticating may include remote server 108 invoking ITM security module 116 to exchange predetermined authentication information, according to predetermined authentication routines, with IT client security module 126, and in particular with ITC/ITM interface portion 127. For example, the authentication may involve one or more security mechanisms.

As discussed herein, security mechanisms may include, but are not limited to, digital signatures, secure hash functions, asymmetric key encryption mechanisms utilizing public and private keys, symmetric key encryption mechanisms, and session key generation algorithms. These security mechanisms may be utilized in one or both of authentication processes and private information exchange processes.

Secure hash functions may provide the basis for electronic signatures and guaranteeing the integrity of information and operate by taking a variable length message and producing a fixed length hash. Changing a single bit in the message will change approximately half of the bits in the hash. The most commonly used cryptographic has functions are MD5 (Message Digest), which produces a 128-bit hash, and SHA-1 (Secure Hash Algorithm) that produces a 160-bit hash.

A strong key generation algorithm requires a truly random number generator or at least a cryptographically secure pseudo random number generator. The seeding material for a pseudo random number generator should be as long as (or longer than) the session key needed. A pseudo random number generator algorithm generates always the same output with the same seeding material; accordingly secure mechanisms 199 may include a seed generator unavailable to others and may be set at the time of manufacture, downloading, or implemented in hardware, for example by the use of a "leaky" diode.

After authentication, the two parties may, at step 158, set up a mechanism to transmit encrypted data from the remote server 108 to the wireless device 102. Setup may include the processing of secure setup procedure 191 (FIG. 6) and may use one or more secure mechanisms 199 stored in security mechanism storage 198 to set up encrypted communications utilizing symmetric key encryption. Unlike the relatively slower authentication process of step 156, the speed of symmetric key cryptography may better lend itself to transmitting larger data files securely between remote server 108 and wireless device 102. Symmetric key encryption requires both sender and receiver having the same shared secret key.

Symmetric key encryption algorithms may be implemented in hardware or software and may include: Data Encryption Standard ("DES"), Triple DES ("3DES"), International Data Key Encryption Algorithm ("IDEA"), Blowfish, CAST-128, and CAST-256.

While these ciphers are fast, key management, that is, the transmission of the symmetric key over an open wireless channel of wireless network 106 is of great concern. Accordingly, asymmetric key encryption, otherwise known as public key encryption, may be employed to solve the problem of secret key distribution by the use of two mathematically complementary keys. Public key encryption is the foundation of Electronic Commerce, Digital Signatures and Virtual Private Networking.

Once an encrypted connection is set up, the remote server 108 may, at step 160, encrypt and transmit data, for example, client configuration information and/or commands to the wireless device 102.

As previously disclosed, based upon the methods and apparatus of system 100, wireless device 102 is operable to securely transmit a client log or other information to remote server 108.

Referring back to step 154, in the case of transmitting data from a wireless device to a remote server, there may be no required authentication of the wireless device 102 on the remote server 108 prior to transmitting the data. In the event of a scheduled data log upload by the wireless device to the remote server, for example, the wireless device is the device making the call, and as the remote server is theoretically collecting logs from multiple wireless devices, authentication at step 161 is optional. However, some aspects may include authenticating either the wireless device 102 or the server 108, in which case, the authentication at step 161 may include secure procedures and mechanisms similar to those comprising step 156. In other embodiments in which authentication is not performed, control may pass directly to step 162, at which time a secure connection may be set up between the remote server 108 and the wireless device 102 using secure setup procedure 191 that may use one or more secure mechanisms 199 stored in security mechanism storage 198.

As previously disclosed, symmetric key encryption may be one cryptographic mechanism stored in storage 198 and may be used at step 164 to encrypt any data, i.e. log data, generated on wireless device 102. Further, after encryption, step 164 may include transmitting the encrypted data, to remote server 108.

Figure 4:
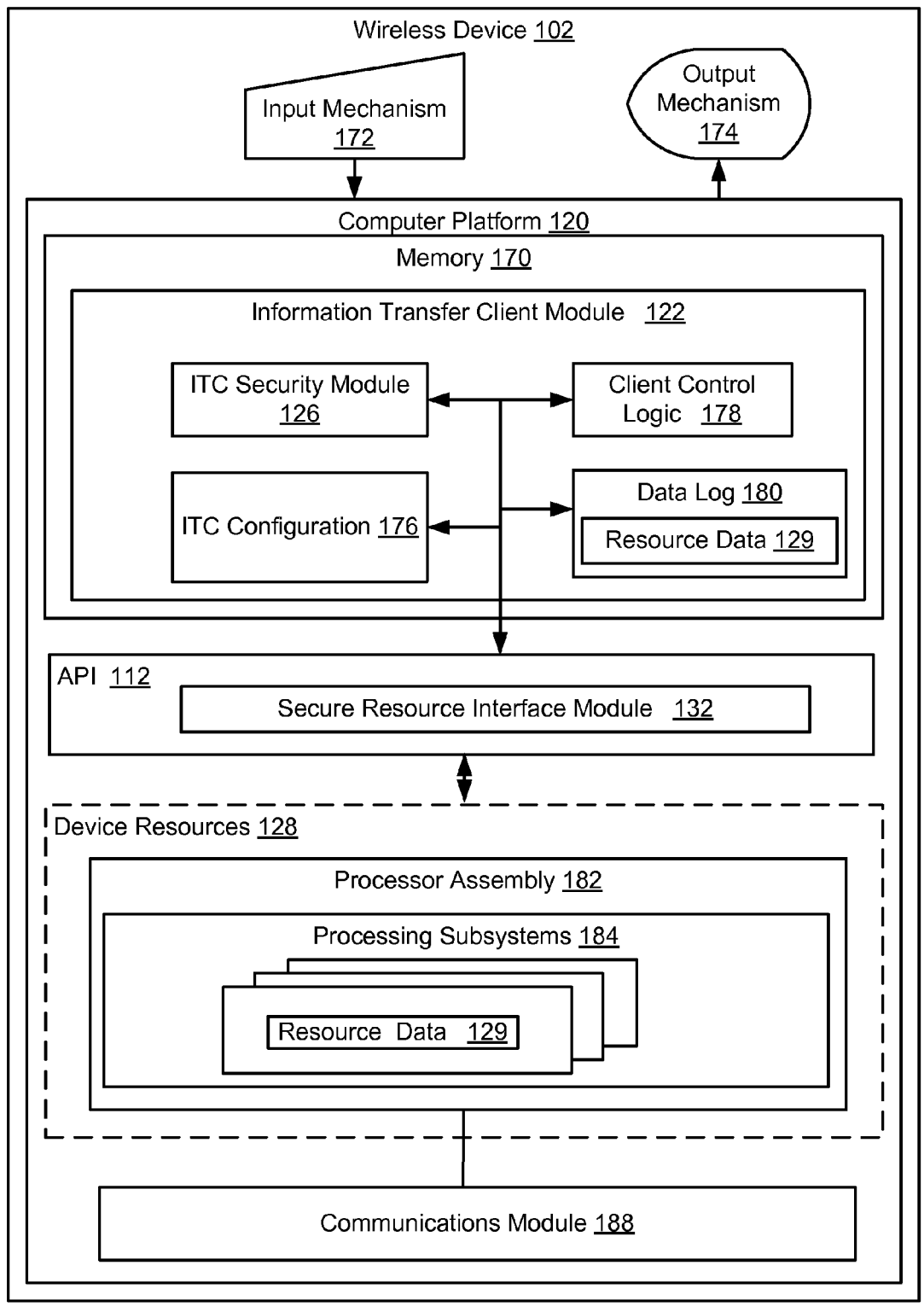
FIG. 4 is a schematic diagram of one aspect of a wireless device according to the system of FIG. 1.

Referring to FIG. 4, wireless device 102 may include any type of computerized device such as a cellular telephone, personal digital assistant, two-way text pager, portable computer, and even a separate computer platform that has a wireless communications portal, and which also may have a wired connection to a network or the Internet. The wireless device can be a remote-slave, or other device that does not have an end-user thereof, but simply communicates data across the wireless network 106, such as remote sensors, diagnostic tools, and data relays.

Further, wireless device 102 may comprise a computer platform 120 having input mechanism 172 and output mechanism 174. Input mechanism 172 may include, but is not limited to, a mechanism such as a key or keyboard, a mouse, a touch-screen display, and a voice recognition module. Output mechanism 174 may include, but is not limited to, a display, an audio speaker, and a haptic feedback mechanism.

Computer platform 120 may further comprise communications module 188 embodied in hardware, software, and combinations thereof, operable to receive/transmit and otherwise enable communication between components internal to wireless device 102, as well as to enable communications between wireless device 102 and other devices on network 106.

Computer platform 120 may also include memory 170, which may comprise volatile and nonvolatile memory such as read-only and/or random-access memory (RAM and ROM), EPROM, EEPROM, flash cards, or any memory common to computer platforms. Further, memory 170 may include one or more flash memory cells, or may comprise any secondary or tertiary storage device, such as magnetic media, optical media, tape, or soft or hard disk.

Furthermore, memory 170 may be operable to store original equipment manufacturer ("OEM") applications and third party client applications, such as information transfer client (ITC) module 122. In one non-limiting aspect, ITC module 122 may include diagnostic software, for example, Remotely Accessible Performance Tool and Optimize® (RAPTOR™) and/or MobileView™ software developed by Qualcomm, Inc., of San Diego, Calif.

Several mechanisms may be used to load applications into memory 170, including but not limited to: static installation at the time of manufacture; downloading via wireless transmission over a wireless network; and over a hardwired connection to a device such as a personal computer (PC).

Device resources 128 may include any information, data, code, functionality, etc. resident on wireless device 102. In some aspects, device resources 128 may include all or portions of memory 170. In other aspects, device resources 128 may include all or any portion of processor assembly 182, which may further include an application-specific integrated circuit ("ASIC"), or other chipset, processor, logic circuit, registers, and/or other data processing device operable to execute client applications and application programming interface ("API") 112.

Additionally, device resources 128 may include one or a combination of processing subsystems 184 that perform specific operations and/or provide specific functionality to wireless device 102. In one aspect, such as in a cellular telephone aspect, processing subsystems 184 may include subsystems such as: sound, non-volatile memory, file system, transmit, receive, searcher, layer 1, layer 2, layer 3, secure socket layer ("SSL"), main control, remote procedure, handset, power management, diagnostics, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc. It should be noted, however, that processing subsystems 184 may vary depending on the given device and/or application. Further, for example, in some aspects, resource data 129 that may be collected by ITC module 122 may reside in registers within one or more processing subsystems 184.

In one non-limiting aspect, API 112 may be a runtime environment executing on the respective wireless device and may call other modules, i.e., secure resource interface module 132, and device resources 128 as required to process requests generated by a client application, i.e., ITC module 122. One such runtime environment is Binary Runtime Environment for Wireless® (BREWED) software developed by Qualcomm, Inc., of San Diego, Calif. Other runtime environments may be utilized that, for example, operate to control the execution of applications on wireless computing devices. API 112, as discussed herein, is operable, through secure resource interface module 132, to manage access to device resources 128, authenticating client applications prior to issuing a device call accessing resource data 129.

Figure 5:
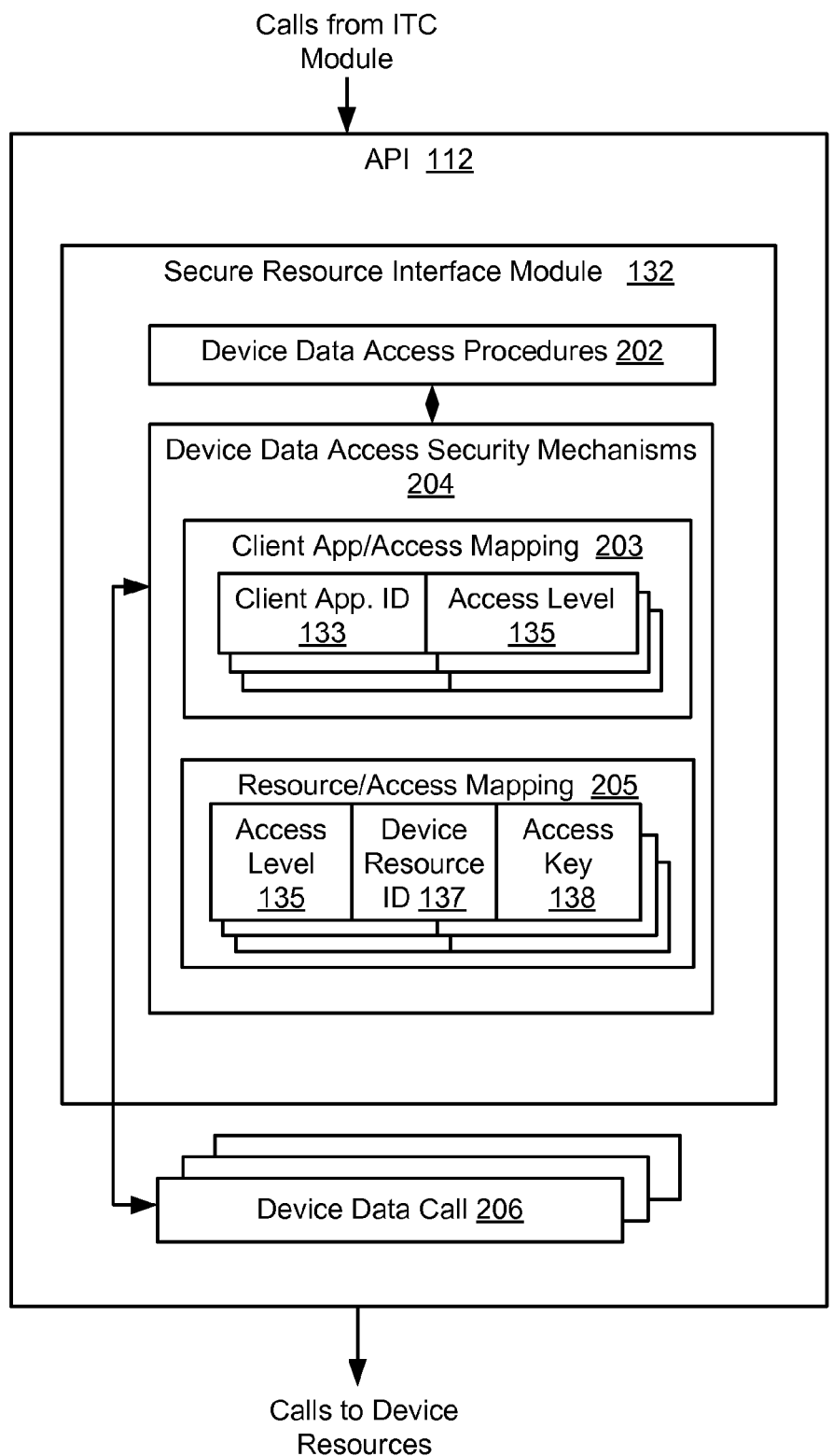
FIG. 5 is a schematic diagram of one aspect of an wireless device API according to the system of FIG. 1.

In some aspects, referring to FIG. 5, API 112 calls upon secure resource interface module 132, and its predetermined device data access procedures 202, to authenticate a data access request made by the client application ITC module 122. Secure resource interface module 132 may comprise hardware, software, firmware, data and instructions for controlling access to API 112 and its associated device data calls 206 that provide interaction with device resources 128. Predetermined device data access procedures 202 may include methods and/or routines that authenticate components for interacting with device resources 128. For example, device data access procedures 202 may require the exchange of predetermined messages, authentication and security-related mechanisms, such as device data access security mechanisms 204, etc., in order to determine whether or not to allow access to at least a portion of API 112. Various authentication/security mechanisms, such as symmetric keys, public/private keys, hash functions, digital certificates, etc., may be stored as device data access security mechanisms 204. Device data access procedures 202 may vary, for example, depending on an identity of an application/component/module requesting access to device resources 128.

Furthermore, in some aspects, secure resource interface module 132 may provide varying levels of access to device resources 128. For example, depending upon the specific authentication/security information passed during the authentication process, API 112 may permit certain device data calls 206 to device resources 128 while denying others. Non-limiting, access to device resources 128 may be implemented using resource/access mapping table 205 that maps a particular access level 135 to a particular device resource 128 and requires a specific key 138 to unlock the API 112. In operation, secure interface module 132 may respond to an application request for a specific access level 135 by using key 138 to authenticate the client application. If authenticated, a second table, client application/access mapping table 203, may be built to map the authenticated application to the corresponding access level 135. Tables 203 and 205 may both be stored in device data access security mechanisms 204 and may be used to verify that future data calls to device resources are within the permissible access level of the calling client application.

Referring back to FIG. 4, ITC module 122 may include hardware, software, firmware, data and/or instructions for gathering device-related and/or network-related information from wireless device 102, and transmitting this information to a corresponding remote server, such as remote server 108. For example, in some aspects, ITC module 122 includes client control logic 178 operable to execute and control the functionality of ITC module 122. In some aspects, for example, client control logic 178 parses ITC configuration 176 and executes information retrieval, storage and transmission functionality based on the given configuration. For example, client control logic 178 may require access to device resources 128 in order to perform diagnostic on, and/or retrieve information from, wireless device 102 and/or network 106. According to a given ITC configuration 176, client logic 178 may, for example, retrieve resource data 129 from one or more subsystems 184 and/or may require one or more subsystems 184 to perform a specific operation. Additionally, for example, client control logic 178 may create and transmit data log 180, including resource data 129 collected based on ITC configuration 176, to remote server 108. Furthermore, under control of client control logic 178, the ITC module 122 may request a download of client configuration 176 from the remote server 108 via communications module 188.

Figure 6:
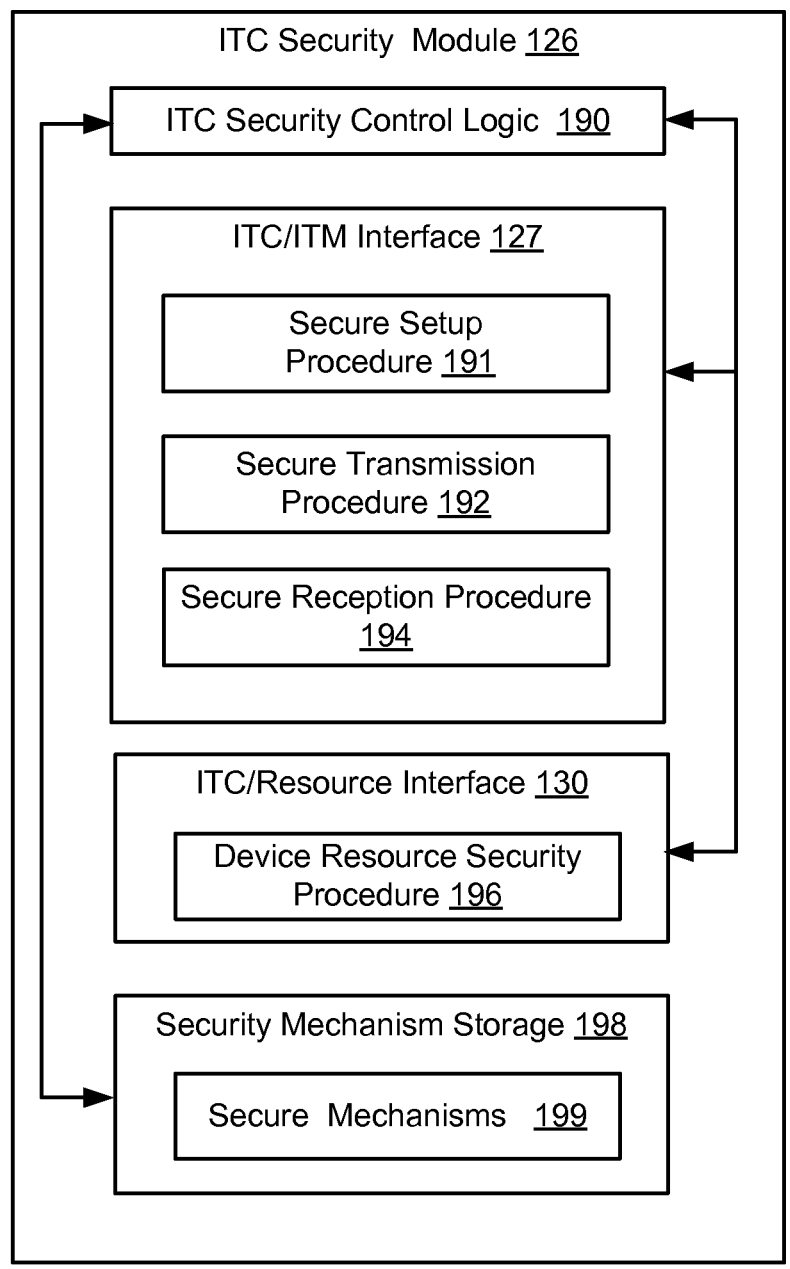
FIG. 6 is a schematic diagram of one aspect of a information transfer client security module as part of a client application on a wireless device according to the system of FIG. 1.

Referring to FIGS. 4 and 6, ITC module 122 may include an ITC security module 126 to provide for authentication, and to ensure secure communications. The ITC security module 126 includes ITC security control logic 190 operable to control secure procedures for ITC module 122. In some aspects, ITC security module 126 may include an information transfer client/information transfer manager ("ITC/ITM") interface portion 128 operable to provide authenticated and/or secure exchanges with ITM 108. In other aspects, ITC security module 126 may include an information transfer client/resource ("ITC/Resource") interface portion 130 operable to provide authenticated and/or secure exchanges between ITC client module 122 and device resources 128, such as via API 112 and the associated secure resource interface module 132. For example, together with API 112, ITC/Resource interface 130 provides logic for authenticating client applications on wireless device 102 based upon a predetermined device resource security procedure 196. Similarly, the ITC/ITM interface 128 provides logic to authenticate remote server 108, and further comprises secure transmission procedure 192 and secure reception procedure 194 to, respectively, transmit and receive encrypted data between the wireless device 102 and the remote server 108. Procedures 192, 194 and 196 may include predetermined methods, routines, sequences of messages, and secure mechanisms 199 for establishing authentication and secure communications. For example, secure mechanisms 199 may include cryptographic devices and/or algorithms, including, but not limited to: secure hash functions, such as MD5 and SHA-1; public key encryption algorithms, such as RSA and pretty good privacy (PGP); symmetric key encryption algorithms, including DES, 3DES, IDEA, Blowfish, CAST-128 and CAST-256; digital certificates; and digital signatures.

In addition, in some aspects, ITC security module 126 may include a security storage 198 in which one or more of the secure mechanisms 199 may reside for access by ITC security control logic 190. For example, security storage 198 may retain public and private keys used by ITC/Resource interface 130 and ITC/ITM interface 127, respectively for both authentication and data encryption/decryption.

Figure 7:
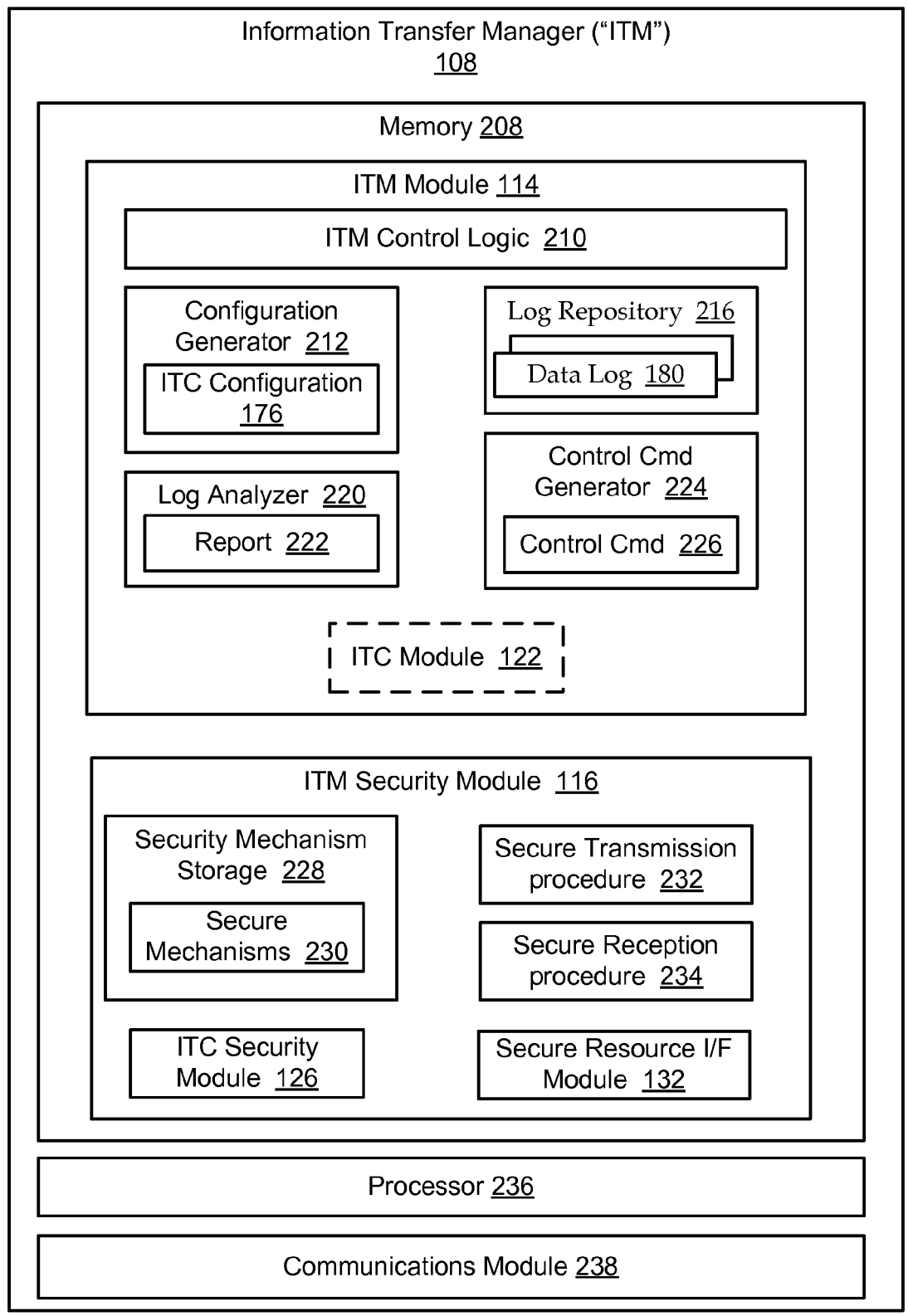
FIG. 7 is a schematic diagram of one aspect of an information transfer manager server according to the system of FIG. 1.

FIG. 7 illustrates an information transfer manager (ITM) 108 operable to receive information, such as data in a data log 180, from resident applications and subsystems 184 of wireless device 102. In some aspects, ITM 108 may be operable to send software agents or applications and configurations, such as ITC module 122, ITC security module 126, Secure Resource Interface Module 132, and/or ITC configuration 176, etc. to wireless device 102 across wireless network 106 in order to provide for authentication and security mechanisms and procedures, and to direct the collection and transmission of information from the wireless device. Furthermore, there may be separate servers or computer devices associated with ITM 108 working in concert to provide data in usable formats to parties, and/or provide a separate layer of control in the data flow. ITM 108 may be a server, personal computer, mini computer, mainframe computer, or any computing device operable to transmit or receive data to wireless device 102 over wireless network 106.

ITM 108 may include a memory 208 for storing data and instructions, a processor 236 for executing instructions and a communications module 238 enabling communications internally within ITM 108 and also with external devices.

Memory 208 may include an information transfer manager ("ITM") module 114 for managing the collection and analysis of information from one or more devices, such as wireless device 102. ITM module 114 may include at least one of any type of hardware, software, firmware, data and executable instructions. ITM module 114 may comprise ITM control logic 210, which is operable to execute the functionality of ITM module 114.

Some aspects of ITM 108 may require ITM module 114 to generate and transmit ITC configuration 176 to wireless device in order to collect and report information, such as, device and/or network diagnostic information. For example, ITM 108 may be associated with an entity, such as a network service provider, a device manufacturer, etc., which desires to collect device-related and/or network-related information from one or more associated wireless devices, for example, to monitor and/or improve device and/or network performance. ITC configuration 176 may comprise, for example, a configuration message that directs a given device on what information to collect, on when to collect the information, and on when to transmit the information to ITM 108.

ITM control logic 210 is operable to control the operation of configuration generator 212, which may generate ITC configuration 176. For example, configuration generator 212 may allow for a selection between a number of collection and reporting parameters in order to define ITC configuration 176.

Furthermore, ITM control logic 210 may further be configured to receive data log 180 from at least one wireless device 102, store the log 180 in log repository 216, and control log analyzer 220 in the generation of report 222. ITM control logic 210 may further operate to control the operation of control command generator 224 in the generation of control commands 226. Control commands 226, when transmitted to wireless device 102, are operable to perform such functions as uploading data log 180, downloading ITC configuration 176, as well as any function available on the wireless device.

Still referring to FIG. 7, ITM module 114 may include ITM security module 116, which includes any hardware, software, firmware, data and instructions that provide for the authentication of ITM 108 to a wireless device, and to allow for the establishment of a secure communications session between ITM 108 and a wireless device. In some aspects, for example, ITM security module 116 includes one or more predetermined secure transmission procedure 232 and/or secure reception procedures 234, which define predetermined security mechanisms, predetermined authentication processes and predetermined setup procedures to initiate a secure exchange of information with wireless device 102. For example, predetermined procedures 232 and 234 may be utilized to encrypt/decrypt data transmissions to/from wireless device 102. Predetermined procedures 232 and 234 may also include one or more secure mechanisms 230, such as symmetric, public and private keys, hash functions, etc., to encrypt data and/or messages, and/or to provide for authentication of an identity of a given wireless device and/or of ITM 108. In some aspects, for example, ITM security module 116 may include a security mechanism storage 228 that serves as a repository for storing one or more security mechanisms 230 in a manner accessible during execution of secure transmission and reception procedures 232 and 234. The security mechanisms 230 may be utilized to authenticate ITM 108 to a wireless device, and/or to provide a cryptographic mechanism to protect the privacy of communications between the ITM and the wireless device.

Further, ITM security module 116 may comprise at least one of ITC security module 126 and a secure resource interface module 132. As discussed above, the information transfer client security module comprises a first set of predetermined mechanisms and procedures for authenticating the apparatus to the wireless device and for establishing a secure information exchange, and the secure resource interface module comprises a second set of predetermined procedures and mechanisms for authenticating information transfer client module 122 operable to execute configuration 176 on the wireless device to the device resource. As such, the secure transmission and reception procedures 232 and 234 and secure mechanisms 230 may be correlated to the corresponding procedures and mechanisms of ITC security module 126 and secure resource interface module 132 to protect against improper information retrieval by rogue servers and/or client applications.

Referring to FIG. 1, wireless network 106 may include any communications network operable, at least in part, for enabling wireless communications between wireless device 102 and any other device connected to wireless network 106. Further, wireless network 106 may include all network components and all connected devices that form the network. For example, wireless network 106 may include at least one, or any combination, of: a cellular telephone network; a terrestrial telephone network; a multicast network such as a Forward Link Only (FLO™) network, including the MediaFLO™ System available from Qualcomm, Inc. of San Diego, Calif.; a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an Infrared Data Association ("IrDA")-based network; a short-range wireless network; a Bluetooth® technology network; a ZigBee® protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a wireless fidelity alliance ("Wi-Fi Alliance") network, and a 802.xx network; a public switched telephone network; a public heterogeneous communications network, such as the Internet; a private communications network; and land mobile radio network.

Suitable examples of telephone networks include at least one, or any combination, of analog and digital networks/technologies, such as: code division multiple access ("CDMA"), wideband code division multiple access ("WCDMA"), universal mobile telecommunications system ("UMTS"), advanced mobile phone service ("AMPS"), time division multiple access ("TDMA"), frequency division multiple access ("FDMA"), orthogonal frequency division multiple access ("OFDMA"), global system for mobile communications ("GSM"), single carrier ("1x") radio transmission technology ("RTT"), evolution data only ("EV-DO") technology, general packet radio service ("GPRS"), enhanced data GSM environment ("EDGE"), high speed downlink data packet access ("HSPDA"), analog and digital satellite systems, and any other technologies/protocols that may be used in at least one of a wireless communications network and a data communications network.

Figure 8:
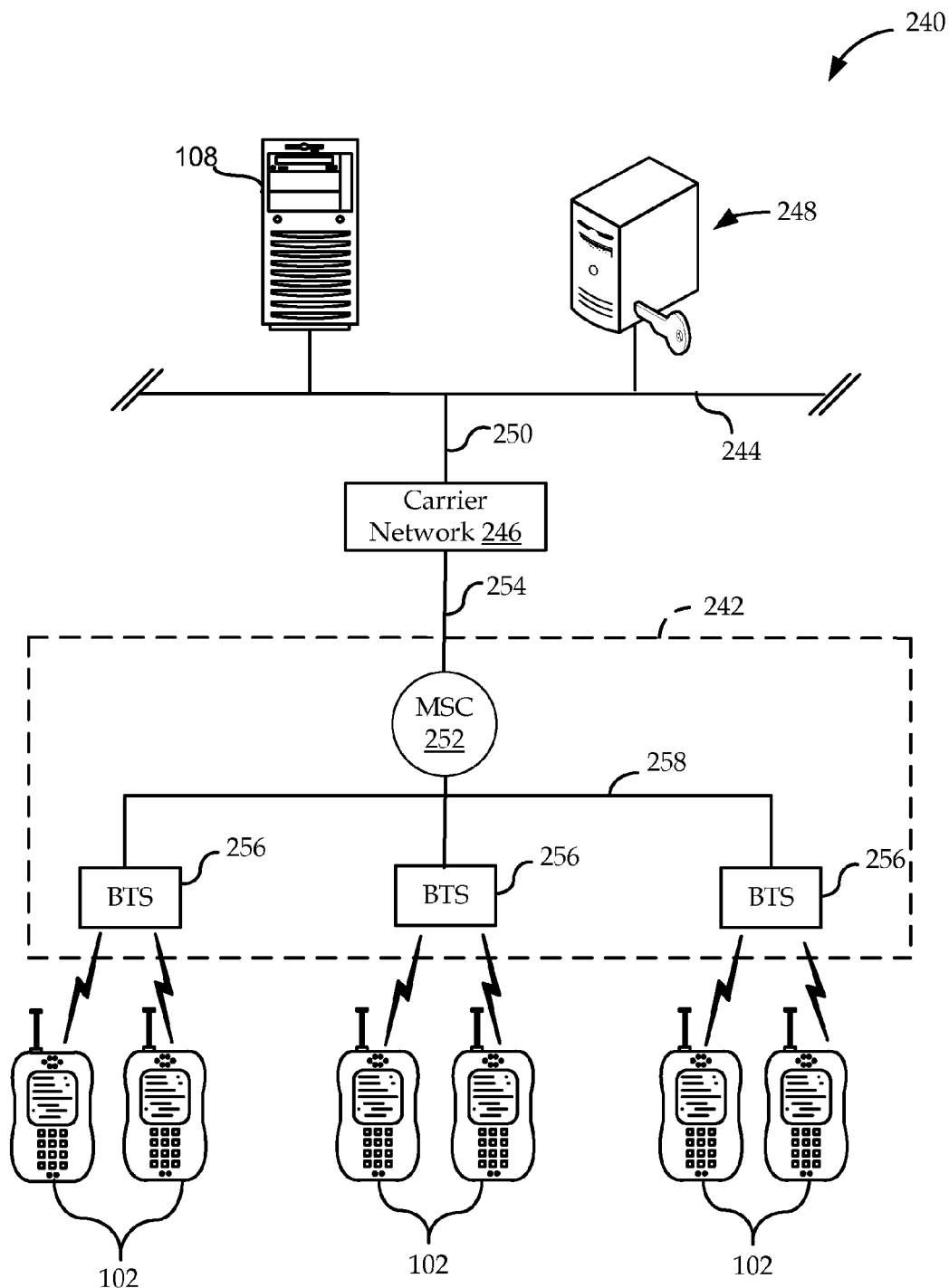
FIG. 8 is a schematic diagram of one aspect of a cellular telephone network according to the system of FIG. 1.

FIG. 8 illustrates a non-limiting cellular telephone system 240 and comprises at least one wireless device 102 and a cellular wireless network 242 connected to a wired network 244 via a wireless carrier network 246. Cellular telephone system 240 is merely exemplary and may include any system whereby remote modules, such as wireless devices 102, communicate packets, including voice and data, over-the-air between and among each other and/or between and among components of wireless network 242, including, without limitation, wireless network carriers and/or servers.

According to system 240, ITM 108 and wireless devices 102 may communicate over wired network 244 (e.g. a local area network, LAN) with a public key server 248. Public keys, for example, for use in the authentication and/or secure communications procedures discussed herein, may be placed on the public key server 248 or sent by E-mail to requesting devices. ITM 108 and public key server 248 may be present along with any other network components needed to provide cellular telecommunication services.

ITM 108, wireless devices 102, and/or public key server 248 may communicate with the carrier network 246 through a data link 250, such as the Internet, a secure LAN, WAN, or other network. Carrier network 246 may control the transmission of messages (generally being data packets) sent to a mobile switching center ("MSC") 252. Further, carrier network 246 may communicate with MSC 252 via a network 254, such as the Internet, and/or POTS ("plain old telephone service"). Typically, in network 246, a network or Internet portion transfers data, and the POTS portion transfers voice information.

MSC 252 may be connected to multiple base stations ("BTS") 256 by another network 258, such as a data network and/or Internet portion for data transfer and a POTS portion for voice information. BTS 256 ultimately broadcasts messages wirelessly to wireless devices 102, such as by short messaging service ("SMS"), or other over-the-air methods.

Figure 9:
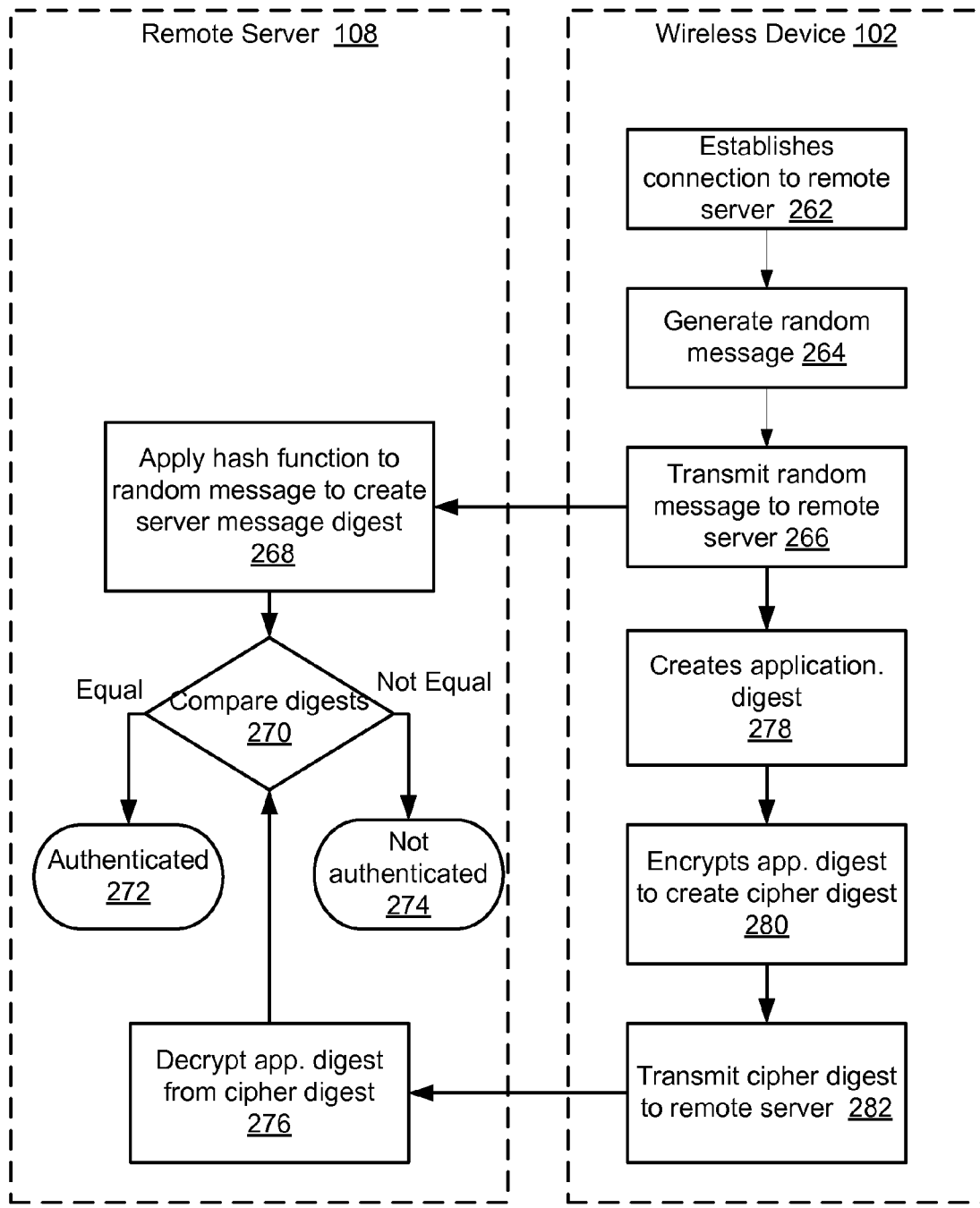
FIG. 9 is a flowchart diagram of an aspect of a method for authenticating a wireless device on a remote server according to the system of FIG. 1.

FIG. 9 illustrates an aspect of a method by which a remote server 108 may authenticate the identity of a wireless device 102 prior to transmitting data, i.e., client configuration and/or commands, to the wireless device 102. It should be noted that the method of FIG. 9 is one example of a plurality of possible authentication methods that may be utilized based on the discussion provided herein, and thus this example should not be construed as being limiting. In some embodiments, authentication mechanisms may be implemented by the ITC module 122 stored on the wireless device 102 in operation with the ITM module 114 on remote server 108.

At step 262, in some aspects, the method may include establishing a connection to a remote server. For example, wireless device 102 may initiate an HTTP connection between communication modules 188 and 238 of wireless device 102 and remote server 108, respectively. The connection may be made under the control of the client control logic 178 of wireless device 102 and ITM module 114 of remote server 108, and may employ a secure socket layer ("SSL") to establish a secure connection between a client and a server.

At steps 264 and 266, the method may include generating a random message to use as a basis for comparison in an authentication procedure, and transmitting the random message to a remote server. For example, under control of ITC security control logic 190 and secure transmission procedure 192, a random message is generated and may be transmitted to the remote server 108 at step 266.

On the remote server, at step 268, the method may include receiving the random message and applying a predetermined security mechanism to the random message to create a server message digest. In this case, the security mechanism may comprise some cryptographic mechanism only known by both an authenticated wireless device and an authenticating remote server. For example, ITM security module 116 may receive the transmitted random message and, based upon secure transmission procedure 232, apply a predetermined secure hash function to the message at step 268, creating a server message digest. The hash function generator and other cryptographic algorithms coded in security mechanism 230 are stored in security mechanism storage 228. The server message digest will be used at a later step to determine authenticity of the wireless device 102.

At step 278, on the wireless device, the method may further include creating an application digest based on applying a predetermined security mechanism to the random message. As noted above, the predetermined security mechanism used by the wireless device should be the same security mechanism known to and used by the remote server in order for the device and server to be properly authenticated. For example, after the ITC/ITM interface 128 transmits the random message to the ITM security module 116, the client application may, at step 278, apply its own predetermined hash function to the random message creating an application message digest.

At step to 280, the method may include encrypting the application digest to create a cipher digest, for example, to allow for the secure transmission of the application digest across a network. For example, the ITC/ITM interface 128 may encrypt the application digest with a public key to create a cipher digest. Further, the method may include transmitting the cipher digest to the remote server. For example, the ITC/ITM interface 128 may transmit the cipher digest to remote server 108.

At step 276, on remote server, the method may include decrypting the cipher digest to obtain a server/application digest. For example, the ITM security module 116 is operable to decrypt the received cipher digest using a private key, corresponding to the public key used by the wireless device, stored in security mechanism storage 228.

And, at step 270, the method may include comparing the server message digest with the server/application digest to determine if they are equal, and hence, to authenticate the wireless device. For example, ITM security module 116 may compare the server/application digest decrypted in step 276 with the message digest created at step 268. If the two digests are equal, then the wireless device 102 is authenticated, and the set-up of an exchange of information may proceed with step 272. If the two digests are not equal, then the wireless device is not authenticated, and the communication may be terminated at step 274.

Modern encryption systems use a combination of symmetric and public key encryption. In some aspects, as noted above, the methods and apparatus disclosed herein may take advantage of the speed of symmetric encryption and the key management advantages of public key encryption to exchange data quickly and securely between remote server 108 to wireless device 102.

Figure 10:
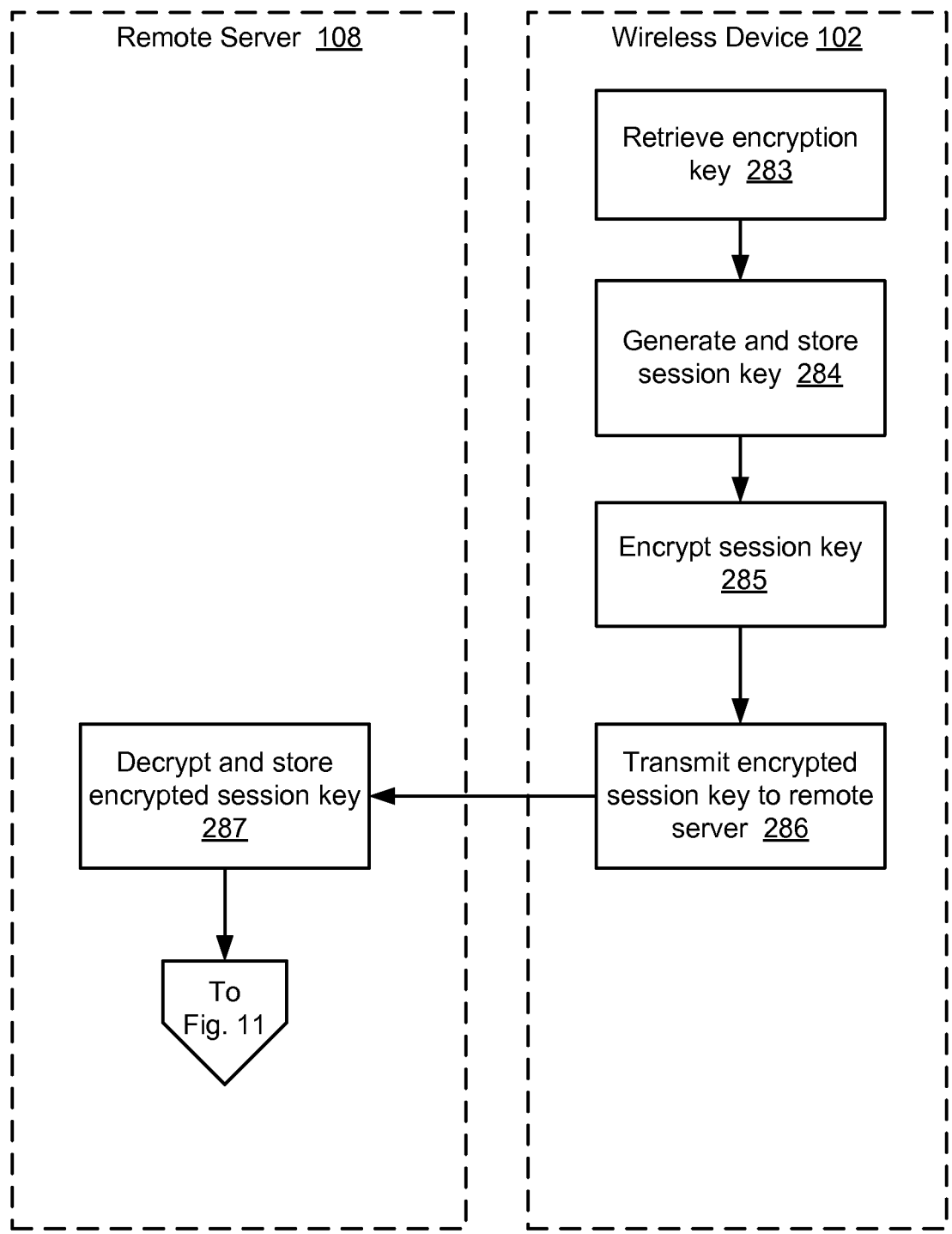
FIG. 10 is a flowchart diagram of an aspect of a method for setting up an encrypted connection between a client application on a wireless device and a remote server according to the system of FIG. 1.
Figure 11:
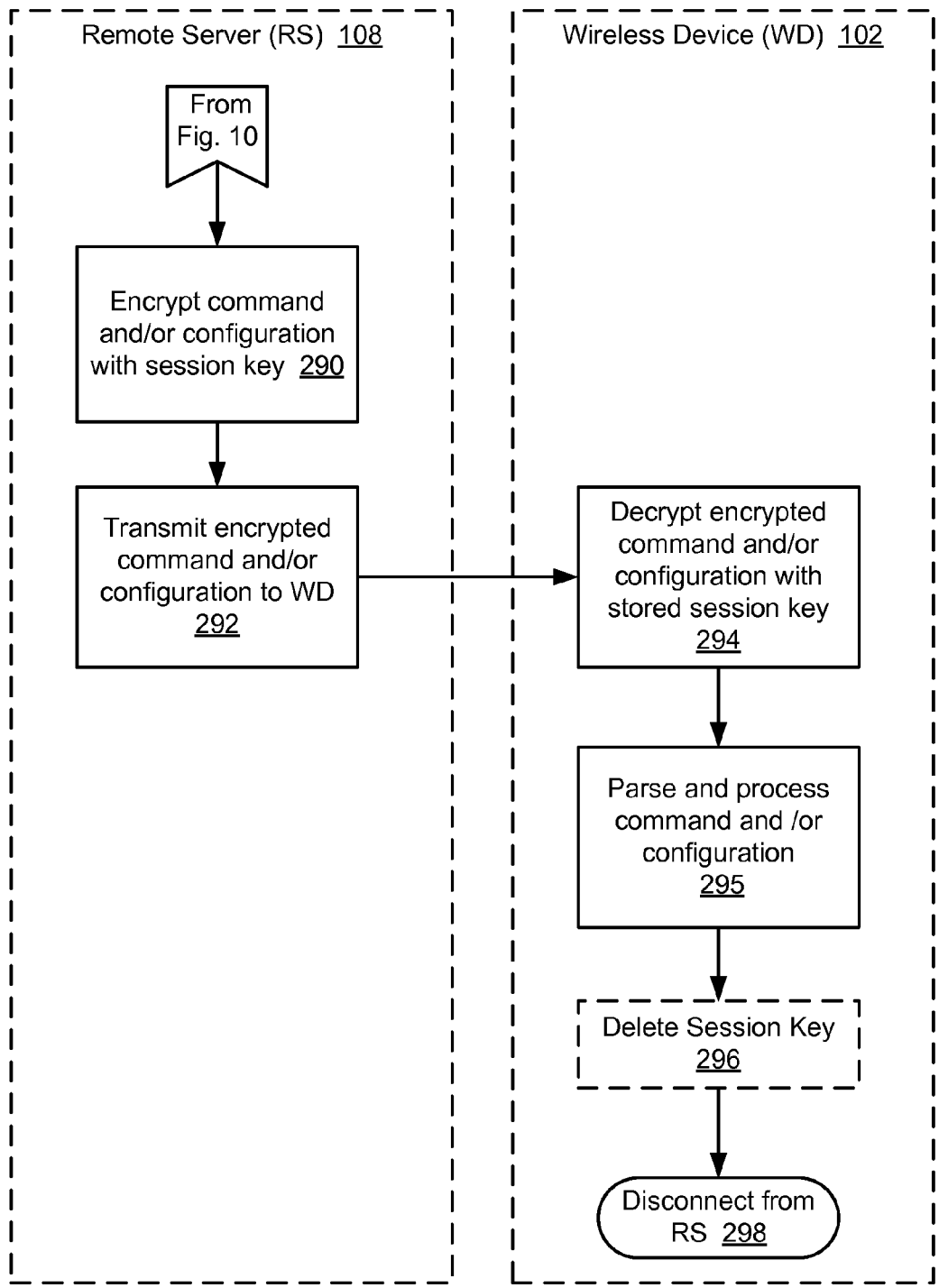
FIG. 11 is a flowchart diagram of an aspect of a method for transmitting encrypted data from a remote server and a wireless client according to the system of FIG. 1.

FIGS. 10 and 11 illustrate an aspect of a method to generate and encrypt a session key on a wireless device 102 and then transmit the encrypted session key to a remote server 108. It should be noted that the method of FIGS. 10 and 11 are one example of a plurality of possible secure communication set-up and exchange methods that may be utilized based on the discussion provided herein, and thus this example should not be construed as being limiting. In some embodiments, wireless device 102 may comprise, as part of ITC security module 126 and security storage 198, stored secure mechanisms 199 that may include public keys of remote devices and their complementary private keys.

At step 283, wireless device 102, and more particularly, the secure transmission procedure 192 of ITC/ITM interface 127, is operable to retrieve the public key of the remote server. In some embodiments, the remote server's public keys may comprise secure mechanism 199 statically loaded into security storage 198 at the time of manufacture of wireless device 102. In other embodiments, the wireless device 102 may obtain the public key directly from the remote server 108 across the wireless network via communications module 188. In other embodiments, the wireless device may retrieve it from a third party, as illustrated by key server 248 in FIG. 8. In further embodiments, keys may be entered via input mechanism 172 such as from a PC, keyboard, and other input devices previously disclosed.

Following step 283, the secure transmission procedure 192 may, at step 284, generate and store a random session key. The session key may be generated by one of secure mechanisms 199, and may include a software implemented version of a pseudo random number generator. In some aspects, the session key may comprise a symmetric key, which provides for a high rate of data exchange, relative to an asymmetric key pair, while still protecting the privacy of the exchanged data.

At step 285, the session key may be encrypted with the public key retrieved at step 285, and transmitted to the ITM security module 116 of the remote server 108 at step 286.

Since the ITM security module 116 has the private key of the complementary key pair, only the remote server 108 can recover and store the session key at step 287.

FIG. 11 is a continuation of FIG. 10 and illustrates an aspect of a method by which remote server 108 may forward encrypted data transmissions to wireless device 102. After decrypting and storing the session key at step 287, the ITM security module 116 may, at step 290, encrypt and, at step 292, transmit any data required to be forwarded securely to wireless device 102. This data may include client configuration 170, control command 226, and any other server based data.

At step 294, the wireless device 102 may use the session key stored at step 284 in security storage 198 to decrypt the encrypted information transmitted by remote server 108. In one aspect, the decryption may be implemented by the ITC/ITM interface 127, and more specifically, secure reception procedure 194 of interface 127. Upon completion of step 294, wireless device 102, under control of client control logic 178, may parse the decrypted data at step 295. In one aspect, the data comprises commands to be executed on the wireless device. In other aspects, the data comprises configuration data which is stored as ITC configuration 176.

Optionally, at step 296, once the information from remote server 108 is decrypted and parsed, wireless device 102 may delete the session key. A new information exchange may then require a new session key, thereby providing for enhanced security in exchanging information.

In some embodiments, the wireless device may transmit a status indication back to the remote server. In other embodiments, the wireless device may, at step 298, simply disconnect from the remote server 108 if no further communication is required.

Figure 12:
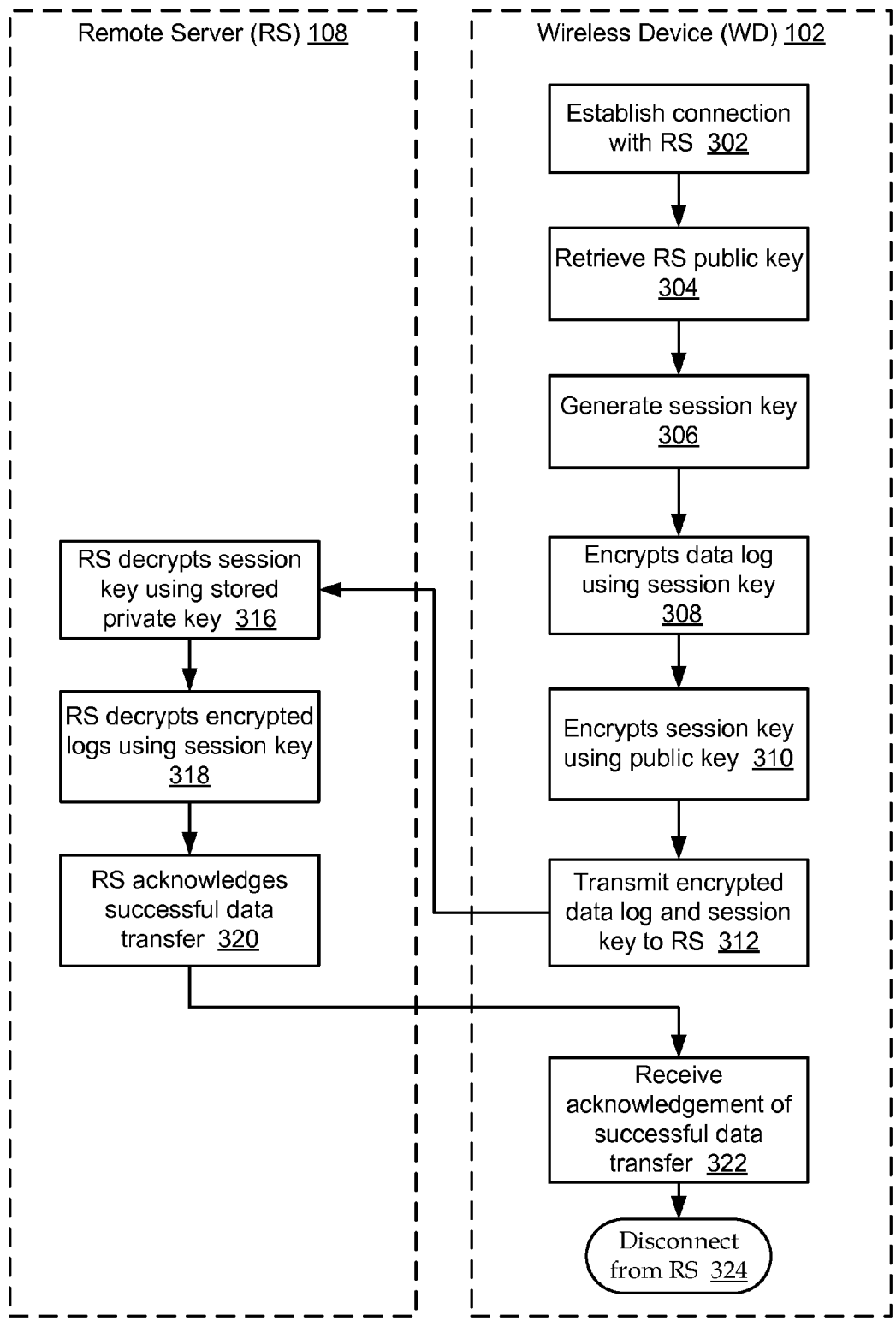
FIG. 12 is a flowchart diagram of an aspect of a method for transmitting client logs to a remote server securely, according to the system of FIG. 1.

FIG. 12 illustrates one aspect of the secure architecture in which data log 180, or any other wireless device data, is securely provided to the remote server 108. It should be noted that the method of FIG. 12 is one example of a plurality of possible secure transmission methods that may be utilized based on the discussion provided herein, and thus this example should not be construed as being limiting.

At step 302, the wireless device 102 may initiate a connection, an HPPT connection, for example, with the remote server 108. This connection may be used to retrieve the remote server's public key at step 304. As previously disclosed, the public key may be obtained via various mechanisms including downloading it from the remote server, via a third party, and being statically loaded onto the wireless device at the time of manufacture or via a PC.

At step 306, the wireless device 102 may generate a random session key, which at step 308, may be used to encrypt data log 180.

At step 310, the session key may be encrypted with the remote server's public key and at step 312 both the encrypted data log and the encrypted session key may be transmitted to the remote server 108 over the wireless network 106.

Since only the ITM security module 116 has the private key of the key pair, only the remote server 108 may operate, at step 316, to recover the session key and at step 318, decrypt the received encrypted data log 180. At step 320 the remote server 108 may transmit an acknowledgement operable to notify the wireless device 102 of the successful transfer of data. After receiving the acknowledgement at step 322, the wireless device may, at step 324, disconnect from the remote server.

As previously disclosed, the secure architecture described herein includes an authentication mechanism protecting static extension API 112 from access by a non-authenticated client application. FIG. 13 discloses one such authenticating mechanism and includes a secure resource interface module 132 being called upon by API 112 to authenticate client application ITC module 122. Intra-wireless device communications between the secure resource interface module 132 and ITC module 122 may be performed by communications module 188 under control of API 112.

As previously disclosed, authentication may be performed once, at startup, initialization/downloading of the client application, at a scheduled time, and at a time determined by the user. Once authenticated, API 112 may process client application requests until such time as the API/client application interface is disabled. The interface may be disabled via several mechanisms including: timing out, lack of activity for a determined amount of time, and power down of the wireless device.

Furthermore, authentication may involve assigning a specific access level to an application, based upon information transferred between the client application and the API at the time of authentication. Access levels may amount to permissions, wherein the wireless device may grant one application more or less permissions to access wireless device resources. Access to device resources 128 may be controlled using a predetermined resource/access level mapping table 205 and a client application/access level mapping table 203 generated at the time of client application authentication.

Referring to FIG. 13, a method for authenticating a client application is illustrated. It should be noted that the method of FIG. 13 is one example of a plurality of possible client application authentication methods that may be utilized based on the discussion provided herein, and thus this example should not be construed as being limiting. The method may start at step 330 with ITC module 122 generating a message, which at step 332, may be transmitted to secure resource interface module 132 where it is received at step 334. The generated message may be random, or may comprise information regarding an access level 135, indicating the level of access required by the client application.

The secure resource interface module 132 may, at step 336, apply a secure hash function to the message generating a message digest to be used for authenticating the client application at step 348. The secure hash function generator may be included with other cryptographic functions stored in device data security mechanism 204.

In addition to forwarding the message to secure resource interface module 132, step 330 may include passing control to step 338, at which time the ITC security module 126 portion of the ITC module 122 may apply its own secure hash function to the message generated at step 330. The secure hash function applied by the ITC module 122 may be implemented in code as part of device resource security procedure 196.

At step 340 the ITC security module 126 may encrypt the message digest of step, and at step 342, transmit the cipher digest to secure resource interface module 132.

The cipher digest may, at step 344, be received by the secure resource interface module 132 and, at step 346, decrypted using a mathematically complementary key to the key used in step 340.

At step 348 the message digest generated in step 336 is compared to the message digest decrypted from the cipher digest in step 346. If the two digests are equal, the authenticity of the client application and the access level contained in the body of the message received in step 334 may be determined at step 351. Once determined, a client application access level 135 may be stored in client application/access mapping table 203 along with client application identification (ID) 137 identifying the specific client application. The client ID 133 and the associated access level 135 may be checked by the API 112 in subsequent client application data calls 352 to determine whether to grant access to device resource data 129. In other embodiments, no additional checks of the client application data calls 252 may be made and once authenticated, all subsequent data calls are processed without further checking, If the digests compared at step 348 are not equal, API 112 is locked at step 350 and the client application is blocked from accessing the device resources requested.

Thus, in some aspects, a wireless device, and in particular an information retrieval client on the wireless device, is provided with mechanisms and routines that assure that a remote device requesting the information is properly associated with the wireless device and/or the information retrieval client. These mechanisms and routines assure the remote device requesting information is not a rogue device trying to steal information. Further, in other aspects, wireless device resources are provided with mechanisms and routines that assure secured access to the resources and their associated device-related and/or network-related information. Such mechanisms and routines assure that only authenticated and properly affiliated information retrieval clients are allowed access, thereby thwarting rogue information retrieval clients.

In some aspects, the affiliation between the wireless device and the remote server allows the properly authenticated remote server to control the settings of the authentication and secure information transfer mechanisms and protocols. The remote server may change the mechanisms and protocols on the wireless device at any time to provide for enhanced security. Similarly, once dealing with an authenticated remote server, the wireless device may direct changes with the mechanisms and protocols on the remote server. For example, once authentication and secure information exchange is established, prior to disconnecting, the remote server and/or the wireless device may conclude an information transfer session by establishing new secure mechanisms and/or routines to use for the next session. Further, in this same manner, the authentication mechanisms and routines, and the secure exchange mechanisms and routines, between the client application and the device resources may be established and changed by the remote server, and/or by the wireless device.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative aspects and/or embodiments, it should be noted that various changes and modifications could be made herein without departing from the scope of the described aspects and/or embodiments as defined by the appended claims. For example, for enhanced security, it should be noted that data stored on wireless device and/or data stored on remote server may be stored in an encrypted format. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus for exchanging data with a wireless device, comprising:
   a configuration generator operable to generate a configuration for receipt by a wireless device, the configuration indicating desired information to be collected and operable to cause the wireless device to collect the desired information from a device resource on the wireless device, wherein the configuration comprises at least one software application configured to execute on a processor of the wireless device to direct the collection of the desired information by the wireless device;
   an information repository operable to store the desired information collected from the wireless device based on the configuration;
   a communications module and a processor operable to establish a connection between the apparatus and the wireless device over a wireless network; and a security module operable to provide a predetermined security mechanism to the wireless device, the predetermined security mechanism being associated with the configuration and being based on a predetermined exchange protocol with the wireless device, wherein the predetermined security mechanism authenticates the apparatus to the wireless device, and wherein the predetermined security mechanism is based on a predetermined security procedure established between the apparatus and the wireless device;

wherein the communication module is configured to send the configuration to the wireless device, receive the desired information from the wireless device, and provide the desired information from the wireless device to the information repository for storage, and wherein the security module is further operable, during the connection between the apparatus and the wireless device and after the communication module receives the desired information from the wireless device, to change at least one of the predetermined security mechanism or the predetermined security procedure.

2. The apparatus of claim 1, wherein the security module further comprises at least one of an information transfer client security module or a secure resource interface module, wherein the information transfer client security module comprises a first set of predetermined procedures for authenticating the apparatus, wherein the secure resource interface module comprises a second set of predetermined procedures for authenticating an information transfer client operable to execute the configuration on the wireless device to the device resource, and wherein the security module is further operable to communicate the respective one of the information transfer client security module and the secure resource interface module to an affiliated wireless device.

3. The apparatus of claim 1, wherein the desired information comprises diagnostic information for the wireless device.

4. The apparatus of claim 1, wherein the desired information comprises diagnostic information for the wireless network.

5. The apparatus of claim 1, wherein the desired information comprises a data log.

6. The apparatus of claim 5, wherein the apparatus further comprises a log analyzer operable to generate a report based on the data log.

7. The apparatus of claim 1, wherein the security mechanism comprises at least one of a digital signature or certificate, a secure hash function, an asymmetric key encryption mechanism utilizing public and private keys, a symmetric key encryption mechanism, or a session key generation algorithm.

8. The apparatus of claim 1, wherein the communications module is configured to transmit secure data over the wireless network by:

establishing a connection with the wireless device;
receiving authenticating information from the wireless device;
setting up an encryption protocol with the wireless device; and
transmitting encrypted data from the apparatus to the wireless device based on the encryption protocol.

9. The apparatus of claim 8, wherein the security module is operable to authenticate the wireless device based upon the authenticating information.

10. The apparatus of claim 8, wherein the configuration comprises at least one configuration message that indicates the desired information to be collected by directing the wireless device to particular information stored by the wireless device.

11. The apparatus of claim 8, wherein the security module is further operable to change at least one of the predetermined security mechanism and the predetermined security procedure in response to receiving an indication from the wireless device to change at least one of the predetermined security mechanism or the predetermined security procedure.

12. The apparatus of claim 1, wherein the wireless device includes a plurality of access levels and the predetermined security mechanism is associated with one access level of the plurality of access levels.

13. A method for secure information exchange with a wireless device over a wireless network, comprising:

establishing a communication protocol between an apparatus and the wireless device;
generating a collection configuration indicating desired information to be collected and operable to cause the wireless device to collect the desired information from a device resource on the wireless device, wherein the collection configuration comprises at least one software application configured to execute on a processor of the wireless device to direct the collection of the desired information by the wireless device;
establishing a connection with the wireless device using the communication protocol on the wireless network;
transmitting the collection configuration and a security mechanism, associated with the collection configuration, to the wireless device over the wireless network, wherein the security mechanism is based on a predetermined security procedure established between the apparatus and the wireless device;
receiving from the wireless device the desired information based on the collection configuration in response to the security mechanism authenticating the apparatus to the wireless device based on a predetermined security procedure; and
changing at least one of the security mechanism or the predetermined security procedure during the connection between the apparatus and the wireless device and after receiving from the wireless device the desired information.

14. The method of claim 13, comprising receiving secure data over the wireless network, including:

receiving authenticating information from the wireless device, the apparatus operable to authenticate the wireless device based upon the authenticating information;
setting up an encryption protocol with the wireless device; and
transmitting encrypted data from the apparatus to the wireless device based on the encryption protocol.

15. The method claim 13, wherein the desired information comprises a data log, and wherein the method further comprises generating a report based on the data log.

16. The method claim 13, wherein the apparatus comprises a remote server.

17. A machine-readable non-transitory medium comprising instructions which, when executed by a machine, cause the machine to perform operations comprising:

establishing a communication protocol between an apparatus and a wireless device;
generating a collection configuration indicating desired information to be collected and operable to cause the wireless device to collect the desired information from a device resource on the wireless device, wherein the collection configuration comprises at least one software application configured to execute on a processor of the wireless device to direct the collection of the desired information by the wireless device;

establishing a connection with the wireless device using the communication protocol on the wireless network;

transmitting the collection configuration and a security mechanism, associated with the collection configuration, to the wireless device over a wireless network, wherein the security mechanism is based on a predetermined security procedure established between the apparatus and the wireless device;

receiving from the wireless device the predetermined information based on the collection configuration; and changing at least one of the security mechanism or the predetermined security procedure during the connection between the apparatus and the wireless device and after receiving from the wireless device the predetermined information.

18. At least one processor configured to perform actions comprising:

establishing a communication protocol between an apparatus and a wireless device;

generating a collection configuration indicating desired information to be collected and operable to cause the wireless device to collect the desired information from a device resource on the wireless device, wherein the collection configuration comprises at least one software application configured to execute on a processor of the wireless device to direct the collection of the desired information by the wireless device;

establishing a connection with the wireless device using the communication protocol on the wireless network;

transmitting the collection configuration and a security mechanism, associated with the collection configuration, to the wireless device over a wireless network, wherein the security mechanism is based on a predetermined security procedure established between the apparatus and the wireless device;

receiving from the wireless device the predetermined information based on the collection configuration; and changing at least one of the security mechanism or the predetermined security procedure during the connection between the apparatus and the wireless device and after receiving from the wireless device the predetermined information.

19. A remote server, comprising:

means for establishing a communication protocol between an apparatus and a wireless device;

means for generating a collection configuration indicating desired information to be collected and operable to cause the wireless device to collect the desired information from a device resource on the wireless device, wherein the collection configuration comprises at least one software application configured to execute on a processor of the wireless device to direct the collection of the desired information by the wireless device;

means for establishing a connection with the wireless device using the communication protocol on the wireless network;

means for transmitting the collection configuration and a security mechanism, associated with the collection configuration, to the wireless device over a wireless network, wherein the security mechanism is based on a predetermined security procedure established between the apparatus and the wireless device;

means for receiving from the wireless device the predetermined information based on the collection configuration; and means for changing at least one of the security mechanism or the predetermined security procedure during the connection between the apparatus and the wireless device and after the means for receiving receives from the wireless device the predetermined information.

* * * * *